US010780446B2

(12) United States Patent
Josten et al.

(10) Patent No.: US 10,780,446 B2
(45) Date of Patent: Sep. 22, 2020

(54) PROCESS FOR PROCESSING AN ADHESIVE AND A DEVICE THEREFOR

(71) Applicant: OLBRICH GmbH, Bocholt (DE)

(72) Inventors: Andre Josten, Bocholt (DE); Dirk Robeling, Bocholt (DE); Frederic Wenning, Bocholt (DE)

(73) Assignee: OLBRICH GmbH, Bocholt (DE)

( * ) Notice: Subject to any disclaimer, the term of this patent is extended or adjusted under 35 U.S.C. 154(b) by 154 days.

(21) Appl. No.: 15/573,784

(22) PCT Filed: Dec. 17, 2015

(86) PCT No.: PCT/DE2015/100539
§ 371 (c)(1),
(2) Date: Nov. 13, 2017

(87) PCT Pub. No.: WO2017/101894
PCT Pub. Date: Jun. 22, 2017

(65) Prior Publication Data
US 2018/0147583 A1 May 31, 2018

(51) Int. Cl.
F26B 23/00 (2006.01)
B05B 1/04 (2006.01)
C08J 3/24 (2006.01)

(52) U.S. Cl.
CPC ............ B05B 1/044 (2013.01); C08J 3/247 (2013.01); F26B 23/001 (2013.01); F26B 23/002 (2013.01); C08J 2343/04 (2013.01)

(58) Field of Classification Search
CPC .................. C08J 3/247; F26B 15/18
See application file for complete search history.

(56) References Cited

U.S. PATENT DOCUMENTS 4,318,944 A * 3/1982 Hall ................ C09D 5/088
427/309
5,023,116 A * 6/1991 Williams ........... B05B 16/90
427/424
(Continued)

FOREIGN PATENT DOCUMENTS

DE  10-2004-003227 A1  6/2005
EP       0259689 A1    3/1988
(Continued)

OTHER PUBLICATIONS

International Search Report (in English and German) and Written Opinion of the International Searching Authority (in German) issued in PCT/DE2015/100539, dated Aug. 31, 2016; ISA/EP.

Primary Examiner — Francisco W Tschen
(74) Attorney, Agent, or Firm — Harness, Dickey & Pierce, P.L.C.

(57) ABSTRACT

The invention relates to a process for processing an adhesive, wherein the process comprises applying an adhesive precursor product onto an adhesive carrier and activating and crosslinking the adhesive precursor product by treating the adhesive precursor product with water vapor and heat in a reaction chamber, and wherein the process is characterized in that air mixed with reaction gases forming during the activation and crosslinking in the reaction chamber is conducted away from the reaction chamber and recirculated as circulating air into the reaction chamber, wherein a portion of used air of the air recirculated as circulating air is replaced by fresh air. The invention further relates to a corresponding device for processing a pressure sensitive hot-melt adhesive.

13 Claims, 1 Drawing Sheet

(56) References Cited

U.S. PATENT DOCUMENTS

| | | | | |
|---|---|---|---|---|
| 5,147,690 A | * | 9/1992 | Faust | F26B 13/104 |
| | | | | 118/58 |
| 5,394,724 A | * | 3/1995 | Griess | B21B 27/035 |
| | | | | 470/1 |
| 5,394,734 A | * | 3/1995 | Wenger | F24F 6/14 |
| | | | | 73/29.01 |
| 5,423,260 A | * | 6/1995 | Goldberg | B41F 23/0493 |
| | | | | 101/424.1 |
| 7,520,457 B1 | * | 4/2009 | Poitras | C05F 17/0223 |
| | | | | 241/101.2 |
| 2003/0032728 A1 | * | 2/2003 | Arhart | C08F 8/42 |
| | | | | 525/100 |
| 2006/0222778 A1 | * | 10/2006 | Dixon | B05D 7/02 |
| | | | | 427/542 |
| 2007/0090130 A1 | | 4/2007 | Hidaka et al. | |
| 2010/0119985 A1 | * | 5/2010 | Potterill | D04H 1/4209 |
| | | | | 432/8 |
| 2011/0185589 A1 | | 8/2011 | Christ | |

FOREIGN PATENT DOCUMENTS

| | | |
|---|---|---|
| EP | 2354740 A2 | 8/2011 |
| WO | WO-2012-090151 A2 | 7/2012 |

\* cited by examiner

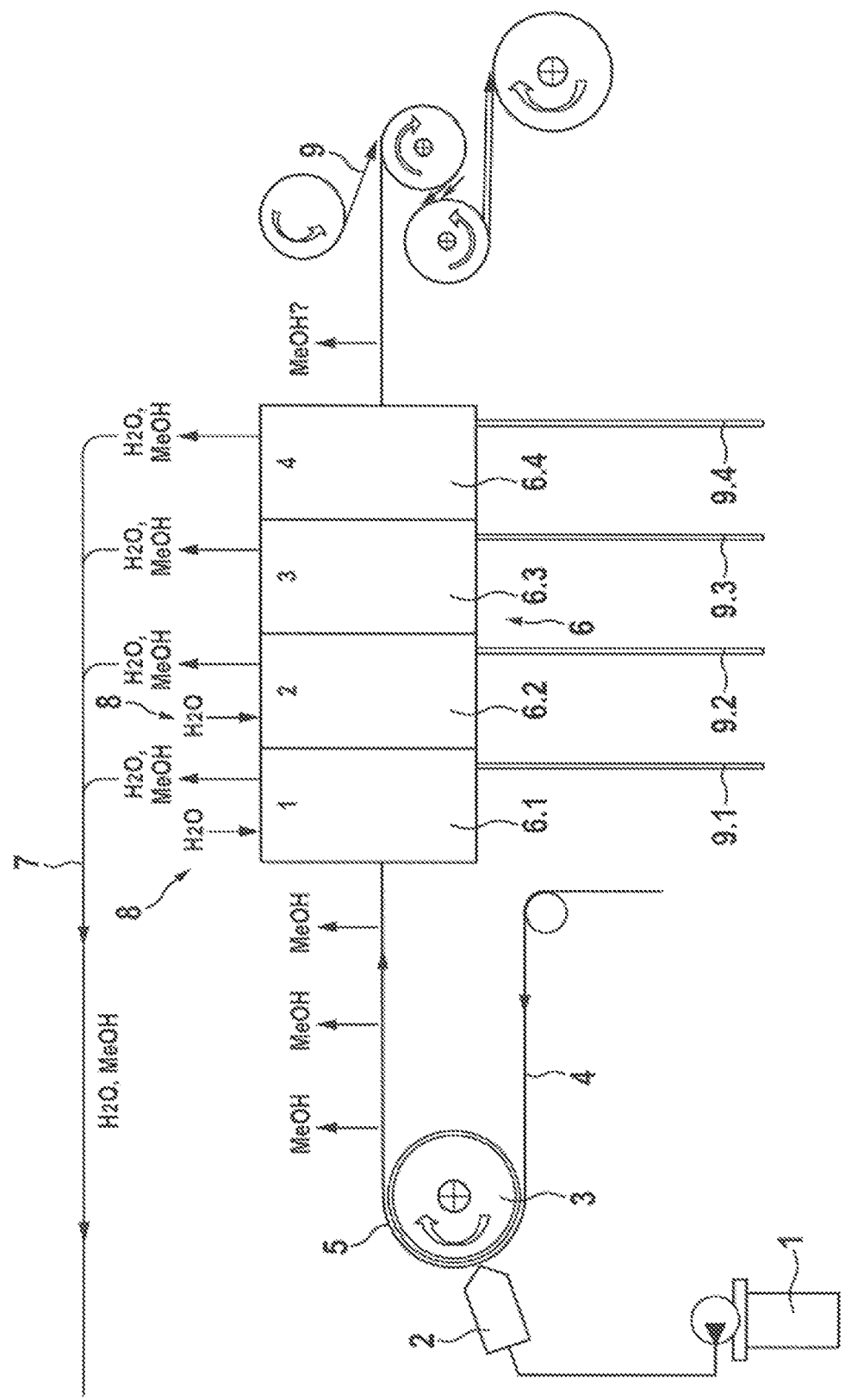

PROCESS FOR PROCESSING AN ADHESIVE AND A DEVICE THEREFOR

CROSS-REFERENCE TO RELATED APPLICATIONS

This application is a 371 U.S. National Stage of International Application No. PCT/DE2015/100539, filed on Dec. 17, 2015. The entire disclosure of the above application is incorporated herein by reference.

FIELD

The invention relates to a process and to a device for processing an adhesive, for example, a pressure sensitive hot melt adhesive or another liquid adhesive, wherein the process comprises applying the adhesive precursor product onto an adhesive carrier and activating and crosslinking the adhesive precursor product by treating the adhesive precursor product with water vapor and heat in a reaction chamber. Such a process and a corresponding device are known from WO 2012/090151 A2.

BACKGROUND

This section provides background information related to the present disclosure which is not necessarily prior art.

Moreover, it is known that, in the activation and crosslinking of adhesive precursor products, strongly exothermally reactive compounds such as methanol are sometimes released. In order to prevent reactive concentrations, the known processes and devices propose to supply the air atmosphere present in the reaction chamber substantially continuously with fresh air, wherein the reactive used air is optionally discharged after appropriate precleaning into the atmosphere.

In the processing of Si-containing adhesives, the formation of methanol (MeOH) was not formerly taken into consideration with regard to safety, wherein this even comprised processes that were run without used air and supply of fresh air. However, in the processing of such adhesives, the need to discharge used air arises. But discharging used air in turn has a crucial influence on the points of the process to be complied with in the processing process. This consequently results in a need to optimize the overall process, if it is run with used air and supply of fresh air.

A process run with used air and supply of fresh air requires, for example, that the operation is carried out with increased water vapor supply in order to maintain the water vapor concentration in the reaction chamber, which is required for activating and crosslinking the adhesive precursor product, in spite of the high rate of discharged used air and of supplied fresh air. Moreover, due to the high level of exchange of used air for fresh air, a correspondingly higher heat supply is necessary in order to maintain the activation and crosslinking reactions. For activating and crosslinking adhesive precursor products, it is absolutely necessary to comply with the process parameters, particularly the process temperatures and the water vapor concentration in the process chamber, within narrow limits.

SUMMARY

This section provides a general summary of the disclosure, and is not a comprehensive disclosure of its full scope or all of its features.

Therefore, the aim of the invention is to further develop a process according to the preamble and a corresponding device in such a manner that they are designed efficiently for processing Si-containing adhesives, particularly with regard to the water vapor and heat supply, and nevertheless enable an effective reaction gas control. Moreover, they should make it possible to include a necessary used air treatment in the process-related optimization.

Accordingly, it is provided that the air of the reaction chamber, which is mixed with reaction gases forming during the activation and crosslinking, is conducted away from the reaction chamber and recirculated as circulating air into the reaction chamber, wherein a portion of used air of the circulating air recirculated as process air is replaced by fresh air. Here, it is possible to provide that the air discharged from the reaction chamber is checked for the concentration of a reactive gas, for example, methanol, in order to provide a fresh air admixture if a certain threshold value determined, for example, based on hazard-potential aspects, is exceeded, said admixture being adjusted so as to lower the concentration of the reactive gas to a safe level. Here, the rate of formation of the reactive gas in the reaction chamber can also be taken into consideration, so that the concentration of the reactive gas in the chamber is always below a certain threshold value. In this way it is possible to achieve that only as much fresh air is supplied as is absolutely necessary based on safety aspects, wherein, at the same time, it is achieved that the activation and crosslinking process is just influenced by the unwanted discharge of water vapor and heat to the smallest extent possible or even that said process can be run without any influence due to the fresh air admixture. Accordingly, the water vapor and heat supply also have to be increased only as much above the extent necessary for the maintenance of the reactions as is necessary for the compensation of the relatively low loss of water vapor and heat content due to the portion of circulating air replaced by fresh air.

In the processing of Si-containing adhesives, an optimized process management can be achieved to the extent that the MeOH in the process air is also in an equilibrium reaction, wherein, by means of a targeted used air and feed air control, for example, by staying under a certain limit value in a targeted manner, a better process performance, for example, with respect to energy use and product quality, can be achieved.

The determination of the concentration of the reaction gas in the reaction chamber air, for example, the determination of a methanol content, can occur by means of conventional sensor systems. For this purpose, for example, FID sensors (FID=Flame Ionization Detector) from the manufacturer Sick Benath Atomic or FTA sensors (FTA=Flame Temperature Analysis) from the manufacturer Scima are known from the prior art.

It is possible to provide that the portion of used air replaced by fresh air is determined so that, in the case of an expected formation of the reaction gas, a reaction concentration limit is not reached at least for a minimum process duration in the reaction chamber. If the composition of the adhesive precursor product is known, it is as a rule possible to predetermine exactly in which quantities it releases reaction gases during the activation and crosslinking. If, in addition, the residence time of the adhesive precursor product in the reaction chamber is known, from which, if the other process parameters such as water vapor concentration and water supply are known, it is possible to calculate to what degree the product is activated and crosslinked as it leaves the reaction chamber, then it is possible to determine exactly how much reaction gas the adhesive precursor product releases during its residence time in the reaction chamber. If the discharged and recirculated air volume is known, it is possible to determine exactly what portion of fresh air has to be supplied to the process air, so that a certain reaction gas concentration upper limit in the reaction chamber is not exceeded.

The portion of used air replaced by fresh air can be at least sufficiently large so that, based on a reaction gas formation per time unit, determined by calculation or estimated upwards, an upper limit for the reaction gas concentration is not reached.

Moreover, it is possible to provide that, in at least two positions spaced laterally from one another in the reaction chamber, a local reaction gas concentration is determined periodically or continuously and used as control variable in a control loop for the determination of the portion of used air of the circulating air discharged from the reaction chamber and replaced by fresh air.

The process can moreover include a moisture control, in which a water vapor concentration in the reaction chamber is readjusted in accordance with an expected or measured water vapor loss based on the used air discharged from the reaction chamber and replaced by fresh air, so that the water vapor concentration in the reaction chamber is kept substantially constant at a predetermined point of the process for the activation and/or the crosslinking of the adhesive precursor product.

The process can additionally or alternatively comprise a moisture control, in which, in the case of an excess increase of a water vapor concentration in the reaction chamber, in particular in a rear subchamber viewed in feed direction of the adhesive precursor product through the reaction chamber, a moisture control of the recirculated circulating air occurs by varying the portion of used air replaced by fresh air.

The reaction chamber can be subdivided into several subsections or subchambers through which the adhesive precursor product on the adhesive carrier is passed successively, wherein, in at least two of the subsections, the adhesive precursor product on the adhesive carrier is treated by a separate process air feed, and wherein at least one local reaction gas concentration in the subsections is continuously or periodically measured and compared with a local target value, wherein, for the process control, the portion of the used air discharged from the reaction chamber and replaced by fresh air is readjusted in accordance with the determined deviations between the target values and the measured actual values for the reestablishment of the local target values.

If the reaction chambers are subdivided into several subsections or subchambers through which the adhesive precursor product on the adhesive carrier is passed successively, it is also conceivable that at least in a first subchamber of the reaction chamber, viewed in feed direction of the adhesive precursor product on the adhesive carrier, a treatment of the adhesive precursor product with water vapor with simultaneous temperature increase occurs, and wherein at least in a second subchamber of the reaction chamber, viewed in feed direction of the adhesive precursor product on the adhesive carrier, with maintenance of the temperature or with additional temperature increase, the water vapor treatment is interrupted. In this manner, it is possible to achieve that, with the leaving of the adhesive precursor product, the crosslinking and activation process of the adhesive precursor product is interrupted beforehand in time, and thus, after leaving the reaction chamber, in any case an additional release of reaction gases which is insignificant in terms of safety aspects still occurs.

Moreover, the feed speed of the adhesive precursor product on the adhesive carrier can be adjusted so that, in the reaction chamber, a methanol concentration or a certain methanol concentration range is maintained, in such a manner that an equilibrium reaction for the curing of an adhesive formed from the adhesive precursor product can be controlled based on the methanol concentration in the reaction chamber air. In this manner, an influence on the product quality is also possible.

The process is particularly suitable for the processing of adhesive precursor products which, during activation and crosslinking, release a compound that is highly flammable in air, for example, methanol. In order to avoid excessive reaction gas concentrations, it is possible to provide that, in some of the subsections or subchambers of the reaction chamber, a methanol content in the air is measured, wherein, based on a known feed speed of the adhesive precursor product on the adhesive carrier through the reaction chamber and based on an expected total methanol release during the activation and crosslinking, the treatment of the adhesive precursor product with water vapor and heat in the reaction chamber is controlled in such a manner that the adhesive precursor product on the adhesive carrier after leaving the reaction chamber is activated to a certain minimum degree and crosslinked. In this manner, it is possible to ensure that, by means of subsequent activation and crosslinking reactions after leaving the reaction chamber, it is at least ensured that the methanol quantities released thereby do not exceed a certain upper limit.

If the reaction chamber is subdivided into several subsections or subchambers through which the adhesive precursor product on the adhesive carrier is passed successively, then it can also be provided that at least in a last subchamber viewed in feed direction of the adhesive precursor product on the adhesive carrier, a concentration of the compound that is highly flammable in air in the chamber air is determined. This can be used to slow or even interrupt the feed of the adhesive precursor product on the adhesive carrier if the determination of the concentration of the compound that is highly flammable in air in the chamber air has shown that a certain upper threshold value has been exceeded.

If the fresh air supply into the reaction chamber is known and if the current reaction gas concentration in the last subchamber is known, the reaction gas release of the adhesive precursor product in the last subchamber, thus immediately before leaving the reaction chamber, can be estimated, so that the process can be adapted accordingly in the case of an excessively high reaction gas release in the last subchamber, for example, by slowing or interrupting the feed speed of the adhesive precursor product on the adhesive carrier, until upper limits determined in the last subchamber for the reaction gas concentration are complied with.

According to another aspect, the invention describes a device for processing an adhesive, for example, a pressure sensitive hot melt adhesive, wherein the device is set up in order to carry out a process of the above-described type. Here, the device can comprise a reaction chamber subdivided into several subchambers, wherein in several or all of the subchambers, in each case a separate heat source is present, by means of which the adhesive precursor product can be treated with heat, wherein in some of the subchambers there is a water vapor source in each case, by means of which the adhesive precursor product can be treated with water vapor, and wherein at least one last subchamber viewed in feed direction of the adhesive precursor product through the reaction chamber comprises a heat source, but not a water vapor source.

Moreover, the device, as well as the above-described process, can be set up to treat the adhesive precursor product with recirculated circulating air having a certain absolute humidity, temperature and also turbulence.

An oxidative, preferably thermal chemical or biological, or a filtering and/or washing used gas after-treatment can be applied to the portion of used air discharged from the reaction chamber and replaced by fresh air.

The regulation of the device can occur in such a manner that beforehand a necessary minimum temperature of the recirculating circulating air as well as an expected possible feed speed can be set. The circulating air temperature, the air speed, the circulating air humidity, the used air volume flow, the feed air volume flow and the surface temperature of the product can be acquired by sensor. In this manner, a stable process can be preset with the above-mentioned influence factors for a certain product (adhesive formulation, application weight).

If the methanol concentration is now inefficiently low in the subchamber, the supply of fresh air and the corresponding portion of used air in the reaction chamber or only in a certain subchamber of said reaction chamber is reduced as safely permissible, i.e., an upper limit for the methanol concentration is not reached. Temperature and moisture are left constant in the process. To the extent that the product properties do not change, the permissible threshold value is also the variable based on which the control is carried out; however, depending on the subchamber, an individual threshold value can be set, which significantly influences the quality of the process and which can be below the permissible threshold value. In this case, the threshold value which turns out to be ideal is established in a fixed manner and the used air needed can be readjusted by means of the control elements feed air and used air. Due to the change in the quantity of used air as a result of a non-optimal methanol concentration, a readjustment of the moisture is necessary. For each subchamber, an optimal process window in this sequence is sought.

Moreover, for the application of the adhesive precursor product onto the adhesive carrier, the invention can comprise a broad-slit nozzle with or without a roll rod, a roll coater or an alternative roll device. The adhesive carrier can be temperature controlled, in particular preheated or heated, in the transport direction before and after a station for the application of the adhesive precursor product, by means of contact or radiation heat. In particular, it is also possible to provide that the adhesive precursor product applied on the adhesive carrier is transported, encapsulated and/or air conditioned, between a station for the application of the adhesive precursor product and a reaction chamber.

As path-guiding counter-roll in the area of a station for the application of the adhesive precursor product on an adhesive carrier, a rubber roll with a hardness between 20 Shore A and 80 Shore D, in particular between 60 Shore A and 95 Shore A, can be used.

In the reaction chamber, the adhesive carrier with applied adhesive precursor product can be exposed to air from above and/or below, wherein the adhesive carrier is fixed by means of lower air nozzles according to the Coanda or Venturi principle on guide rolls provided in the reaction chamber for the transport. The reaction chamber can be designed as a hover channel with hover nozzles. Moreover, the reaction chamber can comprise a housing made of corrosion-resistant material, in particular stainless steel. The reaction chamber, the subsections of the reaction chambers, and the connection sections of the subsections can be insulated against heat loss. The moisture in the reaction chamber or in the subsections of the reaction chamber can be provided in the form of vapor, aerosol, water or feed air with very humid air. Moreover, the adhesive carrier with applied adhesive product, after leaving the reaction chamber, can be cooled to temperatures of less than 60° C., in particular less than 30° C.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Additional details of the invention are explained in reference to the following FIGURE. This FIGURE diagrammatically shows an example of a processing installation for implementing the process for processing an adhesive as described above.

DETAILED DESCRIPTION

Example embodiments will now be described more fully with reference to the accompanying drawings.

Liquid hot melt adhesive precursor material 5 is provided in a melting vat 1 and applied by means of a nozzle 2 which can be a Nordson TrueCoat nozzle, for example, onto an adhesive carrier 4. The adhesive carrier 4 can be a coated paper or an untreated or treated film such as PET or PMMA. It is transported by means of a roll system which comprises a temperature-controlled roll 3 ensuring that the liquid hot melt adhesive precursor material 5 is kept at a temperature enabling said material to be applied on the adhesive carrier 4 as a thin layer. The hot melt adhesive precursor material 5 forms an adhesive precursor product which, applied on the adhesive carrier 4, is led by means of the roll system through the reaction chamber 6 in order to be activated and cross-linked there by means of a heat and water vapor treatment.

The reaction chamber 6 is subdivided into subchambers 6.1, 6.2, 6.3, 6.4. It is provided that the reaction chambers 6.1 and 6.2 are used for the activation and crosslinking of the adhesive precursor product 5, for the purpose of which the subchambers 6.1 and 6.2 in each case comprise a separate water vapor supply 8 and a separate heat supply (not shown). The subchambers 6.3 and 6.4 have no water vapor supply. All the subchambers 6.1-6.4 comprise heat sources that are independent of one another, in order to be able to set the process temperature depending on the subchamber for a finer adjustment of the process. The subchambers 6.1-6.4 in each case can comprise a sensor for the determination of a reaction gas, in this case MeOH, so that, in accordance with the measured reaction gas concentration, the process can be regulated by influencing the water vapor supply and/or by influencing the heat supply.

The subchambers 6.1-6.4 each comprise a used air discharge line 7 and separate process air supplies 9.1-9.4, wherein the process air supplies 9.1-9.4 leading into the subchambers 6.1-6.4 can be readjusted in accordance with the measured reaction gas concentrations in the subchambers 6.1-6.4.

In particular, the process can thus be controlled in such a manner that, after leaving the last subchamber 6.4 viewed in feed direction of the adhesive carrier 4 with the adhesive precursor product 5, the released residual methanol quantity is reduced to a safe minimum. After leaving the reaction chamber 6, the activated and crosslinked adhesive product is coated with a coating layer 9, so that it is enclosed between the coating layer 9 and the adhesive carrier layer 4. However, the coating layer 9 is only optional and not absolutely necessary. For example, it is possible to provide that the processed product consisting of adhesive carrier 4 and adhesive precursor product 5 is rolled up after leaving the reaction chamber and optionally a certain evaporation distance.

For the process control it is possible to provide that feed speed, temperature of the recirculated air, vapor concentration of the recirculated air (that is to say the relative humidity of the air that comes in contact with the adhesive) and the feed air and used air volume stream are adjusted.

By means of the feed speed, as a function of the other parameters, the rough presetting of the process speed is carried out. Via the temperature and the air speed, the heat transfer and the reaction speed can be established. The temperature itself can be set via a heat exchanger (HE), for example, an oil-air HE, a water-air HE, a vapor-air HE, or an electrically heated HE. Alternatively, a direct heating of the reaction chamber 6 can also be provided, for example, by means of a gas burner.

The vapor concentration can be measured by means of a capacitive air humidity sensor or determined by means of a wet bulb measurement. If the actual value deviates from the target value then, for example, additional moisture can be introduced by means of a vapor lance into one of the subchambers 6.1, 6.2. If the vapor concentration is exceeded, the vapor quantity must be reduced by a careful adaptation (increase) of the used air volume flow and, in a correlated manner, of the feed air volume flow.

The used air regulation can be carried out with the aid of correlated feed air and used air valves separately for each of the subchambers 6.1, 6.2, 6.3, 6.4. When the vapor or MeOH concentration is exceeded, the used air valves are opened further and the feed air valves are changed accordingly, so that the influence of the valve position change on the respective subchamber remains limited. The quantified amount of feed air and used air is determined, for example, as a differential pressure value via Pitot tubes or as orifice differential pressure or the like.

The features of the invention disclosed in the above description, in the drawings and in the claims can be essential for carrying out the invention both individually and also in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A process for processing an adhesive, wherein the process comprises:
    applying an adhesive precursor product onto an adhesive carrier;
    treating the adhesive precursor product on the adhesive carrier with water vapor and heat in a reaction chamber to activate and crosslink the adhesive precursor; wherein used air, including air and reaction gas, is generated in the reaction chamber; the reaction gas comprises a flammable compound;
    removing the used air from the reaction chamber;
    replenishing a portion of the used air with fresh air to form a gaseous mixture;
    recirculating the gaseous mixture back into the reaction chamber; and
    wherein a feed speed of the adhesive precursor product on the adhesive carrier is adjusted in such a manner that a flammable compound concentration range in the reaction chamber air is adjusted based on an equilibrium reaction for the curing of an adhesive formed from the adhesive precursor product, and a flammable concentration upper limit in the reaction chamber air is complied with.

2. The process according to claim 1, in which the gaseous mixture is determined so that, in the case of an expected formation of the reaction gas, a reaction gas concentration limit is not reached at least for a minimum process duration, wherefore the portion of used air replaced by fresh air is selected to be at least sufficiently large so that, based on a reaction gas formation determined by calculation or estimated upwards, an upper limit of a reaction gas concentration is not reached.

3. The process according to claim 1, in which, in at least two positions spaced laterally from one another in the reaction chamber, a local reaction gas concentration is determined periodically or continuously and used as control variable in a control loop for the determination of the portion of used air of the circulating air discharged from the reaction chamber and replaced by fresh air.

4. The process according to claim 1, which moreover comprises a moisture control, in which a water vapor concentration in the reaction chamber is readjusted based on the used air discharged from the reaction chamber and replaced by fresh air in accordance with an expected or measured water vapor loss, so that the water vapor concentration in the reaction chamber is kept substantially constant at a predetermined point of the process for the activation and/or the crosslinking of the adhesive precursor product.

5. The process according to claim 1, which moreover comprises a moisture control, in which, in the case of an excess increase in a water vapor concentration in the reaction chamber, in particular in a rear subchamber of the reaction chamber viewed in feed direction of the adhesive precursor product through the reaction chamber, a moisture control of the recirculated circulating air occurs by varying the portion of used air replaced by fresh air.

6. The process according to claim 1, in which the reaction chamber is subdivided into several subsections or subchambers through which the adhesive precursor product on the adhesive carrier is passed successively, wherein, in at least two of the subsections, the adhesive precursor product on the adhesive carrier is treated by a separate process air feed, and wherein in each case a local reaction gas concentration in the subsections is measured continuously and compared with a local target value, wherein, for the process control, the portion of used air of the circulating air which is discharged from the reaction chamber and replaced with fresh air is readjusted in accordance with the determined deviations between the target values and the actual measured values for the reestablishment of the local target values.

7. The process according to claim 1, in which the reaction chamber is subdivided into several subsections or subchambers through which the adhesive precursor product on the adhesive carrier is passed successively, wherein, in a first subchamber of the reaction chamber viewed in feed direction of the adhesive precursor product on the adhesive carrier, the adhesive precursor product is treated with water vapor with simultaneous temperature increase, and wherein, in a second subchamber of the reaction chamber viewed in feed direction of the adhesive precursor product on the adhesive carrier, with maintenance of the temperature or additional temperature increase, the water vapor treatment is interrupted.

8. The process according to claim 1, wherein the flammable compound is methanol, and wherein during the activation and crosslinking of the adhesive precursor product, flammable compound is released.

9. The process according to claim 8, in which the reaction chamber is subdivided into several subchambers through which the adhesive precursor product on the adhesive carrier is passed successively, wherein, in several of the subchambers, a methanol content in the air is measured, and wherein, based on a known feed speed of the adhesive precursor product on the adhesive carrier through the reaction chamber and on an expected total methanol release during the activation and crosslinking, the treatment of the adhesive precursor product with water vapor and heat in the reaction chamber is controlled in such a manner that, after leaving the reaction chamber, the adhesive precursor product on the adhesive carrier is activated and crosslinked to a certain minimum extent.

10. The process according to claim 8, in which the reaction chamber is subdivided into several subsections or subchambers through which the adhesive precursor product on the adhesive carrier is passed successively, wherein, in at least one last subchamber viewed in feed direction of the adhesive precursor product on the adhesive carrier, a concentration of the flammable compound in the chamber air is determined.

11. The process according to claim 10, in which the feed of the adhesive precursor product on the adhesive carrier is slowed or interrupted if the determination of the concentration of the flammable compound in the chamber air has shown that a certain upper threshold value has been exceeded.

12. The process according to claim 1, in which the flammable compound is methanol.

13. The process according to claim 1, in which an oxidative, thermal or biological, or a filtering and/or washing used gas after-treatment is applied to the portion of used air discharged from the reaction chamber and replaced by fresh air.

* * * * *